United States Patent
Doppler et al.

(10) Patent No.: US 9,219,570 B2
(45) Date of Patent: Dec. 22, 2015

(54) FEEDBACK AND LINK ADAPTATION TECHNIQUES FOR WIRELESS NETWORKS

(75) Inventors: Klaus Franz Doppler, Espoo (FI); Carl Simon Wijting, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 1187 days.

(21) Appl. No.: 12/599,084

(22) PCT Filed: Apr. 30, 2008

(86) PCT No.: PCT/IB2008/001078
§ 371 (c)(1),
(2), (4) Date: Sep. 2, 2010

(87) PCT Pub. No.: WO2008/135833
PCT Pub. Date: Nov. 13, 2008

(65) Prior Publication Data
US 2010/0329134 A1 Dec. 30, 2010

Related U.S. Application Data

(60) Provisional application No. 60/916,540, filed on May 7, 2007.

(51) Int. Cl.
*H04L 1/00* (2006.01)
*H04L 1/18* (2006.01)

(52) U.S. Cl.
CPC ............ *H04L 1/0026* (2013.01); *H04L 1/0029* (2013.01); *H04L 1/0003* (2013.01); *H04L 1/0009* (2013.01); *H04L 1/1812* (2013.01)

(58) Field of Classification Search
USPC ......... 370/252, 334, 335, 336, 342; 455/67.7, 455/67.11, 70, 436, 450, 561
See application file for complete search history.

(56) References Cited

U.S. PATENT DOCUMENTS

2002/0147017 A1* 10/2002 Li et al. ................... 455/447
2004/0037247 A1* 2/2004 Ngo ......................... 370/332

(Continued)

FOREIGN PATENT DOCUMENTS

| CN | 1781274 | 5/2006 |
|---|---|---|
| WO | 0049760 A1 | 8/2000 |
| WO | 2004098072 A2 | 11/2004 |

OTHER PUBLICATIONS

3GPP TSG RAN WG1, Tdoc R1071104, Huawei, 'System level evaluation of CQI compression schemes for E-UTRA', St. Louis USA, Feb. 2007.

(Continued)

*Primary Examiner* — Brandon Renner
*Assistant Examiner* — Prince A Mensah
(74) *Attorney, Agent, or Firm* — Squire Patton Boggs (US) LLP

(57) ABSTRACT

Various example embodiments are disclosed relating to feedback and link adaptation techniques for wireless networks. According to an example embodiment, an apparatus may include a processor or controller. The controller may be configured to determine a channel quality indication (CQI) value for each of a plurality of wireless sub-channels, discard any of the CQI values older than a threshold time, leaving a set of current CQI values, determine a percentile CQI value based on the set of current CQI values, and transmit the percentile CQI value to an infrastructure node. The infrastructure node, may, for example, determine or select one or more data transmission parameters, such as a modulation scheme and/or coding rate, based at least in part on the received percentile CQI value.

21 Claims, 10 Drawing Sheets

(56) References Cited

U.S. PATENT DOCUMENTS

| | | | |
|---|---|---|---|
| 2004/0151146 | A1 | 8/2004 | Hammerschmidt |
| 2004/0203420 | A1* | 10/2004 | Rick et al. ................. 455/67.11 |
| 2004/0233872 | A1* | 11/2004 | Lobinger et al. ............. 370/334 |
| 2005/0054359 | A1 | 3/2005 | Ishii et al. |
| 2006/0094436 | A1* | 5/2006 | Kim et al. .................... 455/450 |
| 2007/0026810 | A1* | 2/2007 | Love et al. ................. 455/67.11 |
| 2007/0298728 | A1* | 12/2007 | Imamura et al. ............... 455/77 |
| 2008/0240030 | A1 | 10/2008 | Kolding et al. |

OTHER PUBLICATIONS

Dottling, m. et al; 'Efficient channel quality feedback schemes for adaptive modulation and coding of packet data,' Vehicular Technology Conference, 2004. VTC2004-Fall. 2004 IEEE 60th, vol. 2, p. 1243-1247, Sep. 26-29, 2004.

"International Search Report and the Written Opinion of the International Searching Authority", received in corresponding PCT Application No. PCT/IB2008/001078, Dated Nov. 19, 2008, 6 pages.

Office Action received for corresponding Chinese Patent Application No. 200880015117.X, dated Jan. 6, 2013, 6 pages.

Office Action received for corresponding Chinese Patent Application No. 200880015117.X, dated Apr. 25, 2012, 25 pages.

R1-060306, "Link Adaptation Scheme for Single-antenna Transmission in E-UTRA Downlink", 3GPP TSG-RAN WG1 Meeting #44, Feb. 2006.

R1-071417, "System level evaluation of CQI compression schemes for E-UTRA", 3GPP TSG RAN WG1 Meeting #48bis, Mar. 2007.

Soo-Yong Jeon, Dong-Ho Cho, "Channel Adaptive CQI Reporting Schemes for HSDPA Systems", IEEE Communications Letters, vol. 10, No. 6, Jun. 2006.

R1-063268, "CQI reporting for E-UTRA" 3GPP TSG RAN WG1 Meeting #47 Riga, Latvia, Nov. 6-10, 2006.

R1-062842, "CQI design and its impact of DL performance". R3GPP TSG RAN WG1#46bis, Seoul, Korea, Oct. 9-13, 2006.

Chinese Office Action application No. 200880015117.X dated Jun. 4, 2013.

T.E. Kolding et al., "Low-Bandwidth Channel Quality Indication for OFDMA Frequency Domain Packet Scheduling", Wireless Communication Systems, IEEE, Sep. 1, 2006, 5 pages.

Hiawei, "Downlink Adaptation/Scheduling Guided by an Efficient CQI-Feedback Scheme", TSG RAN WG1 meeting 44bis, R1-060821, Mar. 2006, 5 pages.

European Search Report application No. 08750869.3 dated Sep. 26, 2013.

Office Action dated Aug. 5, 2015, issued in corresponding CN Application No. 200880015117.X (with English translation).

\* cited by examiner

FEEDBACK AND LINK ADAPTATION TECHNIQUES FOR WIRELESS NETWORKS

RELATED APPLICATION

This application was originally filed as PCT Application No. PCT/IB2008/001078 filed Apr. 30, 2008, which claims priority to U.S. Provisional Application No. 60/916,540 filed May 7, 2007.

PRIORITY CLAIM

This application claims the benefit of priority of U.S. Provisional Patent Application No. 60/916,540, filed May 7, 2007, entitled "Feedback And Link Adaptation Techniques For Wireless Networks," the disclosure, which is hereby incorporated by reference.

BACKGROUND

A number of different techniques have been employed to use wireless media or wireless resources more efficiently. For example, it is common for wireless nodes or devices to provide rate adaptation, where a modulation scheme may be adjusted based on changing channel conditions. This may allow higher order modulation schemes to be used where channel conditions are more favorable.

For example, as described in "WCDMA for UMTS—Radio Access For Third Generation Mobile Communications", H. Holma and A. Toskala (editors), 2005, wireless technologies such as Wideband Code-Division Multiple Access (WCDMA) through high-speed downlink packet access (HSDPA) and Third Generation Partnership Project (3GPP) UTRAN Long Term Evolution may allow improved exploitation of radio channel variations through link adaptation and channel dependent scheduling. Data transmission rate may be adjusted based on downlink channel quality information (CQI) provided as feedback from the wireless node (or user terminal, UE) to the scheduler located in the infrastructure node (or base station, eNodeB).

In addition to adaptation in the time-domain as exemplified in e.g. HSDPA, wireless systems based on orthogonal frequency domain multiple access (OFDMA), such as the UTRAN Long Term Evolution "Technical Solution for the 3G Long-Term Evolution," Ekstrom, et al, March, 2006 allow for channel dependent scheduling also in the frequency domain provided that information about the channel quality in both time and frequency at each UE (user equipment) location are available at the scheduling node.

In addition, there are different techniques that have been developed to report or provide channel quality information (CQI) (or channel quality indication), to a packet scheduler for OFDMA systems. For example, the best-M method allows a wireless node to report channel quality information for the M highest quality channels (or sub-channels). As another example, a threshold CQI technique may be employed, where a wireless node may report channel quality information for the best or highest quality channel, and for other channels having a channel quality that is within a specific threshold of the best or highest quality channel. Unfortunately, current techniques for feedback and link adaptation may not sufficiently adapt to changing channel conditions or network complexities.

SUMMARY

Various example embodiments are disclosed relating to feedback and link adaptation techniques for wireless networks. According to an example embodiment, a method may include determining a channel quality indication (CQI) value for each of a plurality of wireless sub-channels, discarding any of the CQI values older than a threshold time, leaving a set of current CQI values, determining a percentile CQI value based on the set of current CQI values and transmitting the percentile CQI value to an infrastructure node.

According to another example embodiment, an apparatus may include a processor or controller. The controller may be configured to determine a channel quality indication (CQI) value for each of a plurality of wireless sub-channels, discard any of the CQI values older than a threshold time, leaving a set of current CQI values, determine a percentile CQI value based on the set of current CQI values, and transmit the percentile CQI value to an infrastructure node. The infrastructure node may, for example, determine or select one or more data transmission parameters, such as a modulation scheme and/or coding rate, based at least in part on the received percentile CQI value.

According to another example embodiment, a method may include receiving a percentile request from an infrastructure node in a wireless network, receiving one or more packets, each packet including signals on a plurality of sub-channels, determining a channel quality indication (CQI) value for each of a plurality of the sub-channels based on the one or more received packets, discarding CQI values older than a threshold time, leaving a set of current CQI values, determining a percentile CQI value for a first group of the CQI values based on the set of current CQI values, determining a percentile CQI value for a second group of the CQI values based on the set of current CQI values, and transmitting the percentile CQI values for the first and second groups to the infrastructure node in response to the percentile request.

In another example embodiment, an apparatus may include a controller and a wireless transceiver. The controller may be adapted or configured to receive a percentile request from an infrastructure node in a wireless network, receive one or more packets, each packet including signals on a plurality of sub-channels, determine a channel quality indication (CQI) value for each of a plurality of the sub-channels based on the one or more received packets, discard CQI values older than a threshold time, leaving a set of current CQI values, determine a percentile CQI value for a first group of the CQI values based on the set of current CQI values, determine a percentile CQI value for a second group of the CQI values based on the set of current CQI values, and transmitting the percentile CQI values for the first and second groups to the infrastructure node in response to the percentile request.

According to another example embodiment, a method may include receiving a percentile request from an infrastructure node in a wireless network, receiving one or more packets, each packet including signals on a plurality of sub-channels, determining a channel quality indication (CQI) value for each of a plurality of the sub-channels based on the one or more received packets, discarding CQI values older than a threshold time, leaving a set of current CQI values, determining a percentile CQI value for a first group of the subchannels based on the set of current CQI values, determining a percentile CQI value for a second group of the subchannels based on the set of current CQI values, and transmitting the percentile CQI values for the first and second groups to the infrastructure node in response to the percentile request.

In another example embodiment, an apparatus may include a controller and a wireless transceiver. The controller may be adapted or configured to receive a percentile request from an infrastructure node in a wireless network, receive one or more packets, each packet including signals on a plurality of subchannels, determine a channel quality indication (CQI) value for each of a plurality of the sub-channels based on the one or more received packets, discard CQI values older than a threshold time, leaving a set of current CQI values, determine a percentile CQI value for a first group of the subchannels based on the set of current CQI values, determine a percentile CQI value for a second group of the subchannels based on the set of current CQI values, and transmitting the percentile CQI values for the first and second groups to the infrastructure node in response to the percentile request.

According to another example embodiment, a method may include sending a percentile request to a wireless node, receiving a percentile CQI value from the wireless node, the percentile CQI value being based on a current set of CQI values maintained at the wireless node, and determining or selecting a modulation scheme and/or coding rate for data transmissions to the wireless node based on the percentile CQI value.

According to yet another example embodiment, an apparatus may include a controller or processor. The controller may be adapted or configured to send a percentile request to a wireless node, receive a percentile CQI value from the wireless node, the percentile CQI value being based on a current set of CQI values maintained at the wireless node, and determine or select a modulation scheme and/or coding rate for data transmissions to the wireless node based on the percentile CQI value.

The details of one or more implementations are set forth in the accompanying drawings and the description below.

DETAILED DESCRIPTION

Figure 1:
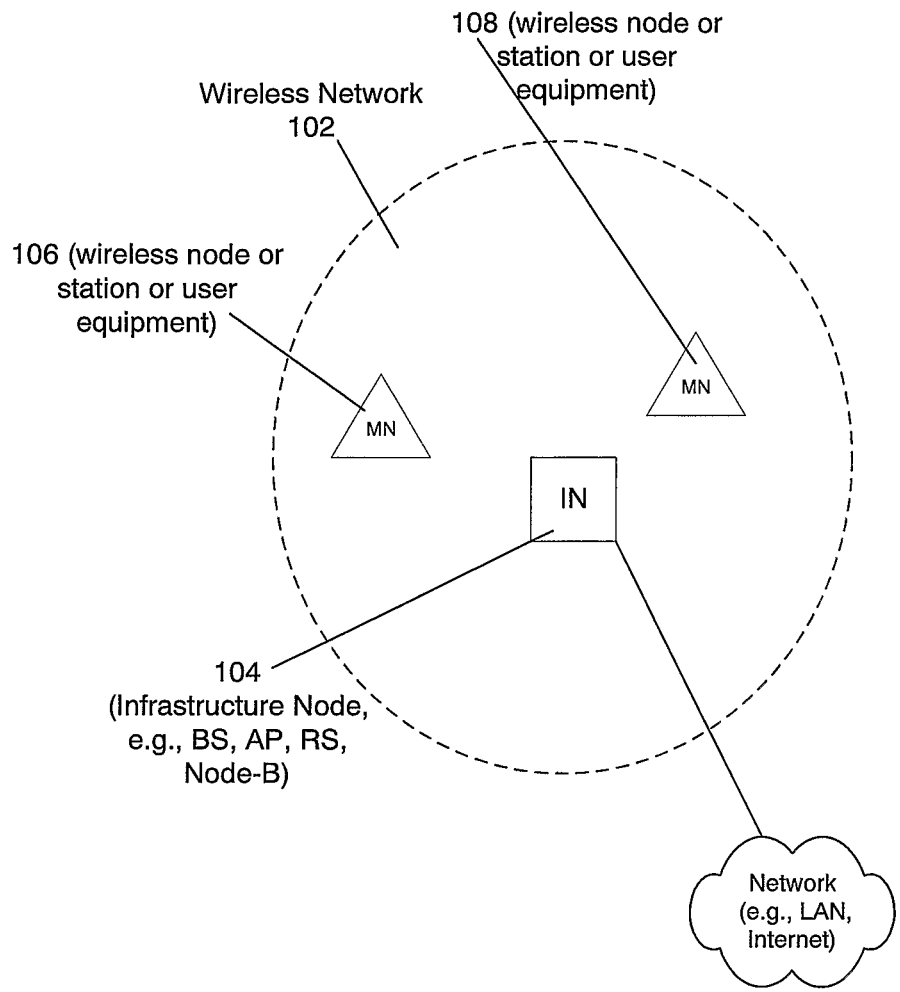
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as a wireless infrastructure node 104 (which may include an access point (AP) or base station, relay station, a node B, or the like), and one or more mobile nodes or mobile stations (or user equipment or user terminals), such as wireless nodes 106 and 108. While only one infrastructure node 104 and two wireless nodes or mobile stations (or user equipment or user terminals) 106, 108 are shown in wireless network 102, any number may be provided. Each wireless node, e.g., nodes 106, 108, in network 102 may be in wireless communication with the wireless infrastructure node 104, and may even be in direct communication with each other. Wireless infrastructure node 104 may be coupled to a fixed network, such as a Local Area Network (LAN), Wide Area Network (WAN), Radio Access Network (RAN), the Internet, etc., and may also be coupled to other wireless networks or to other infrastructure nodes.

Figure 2:
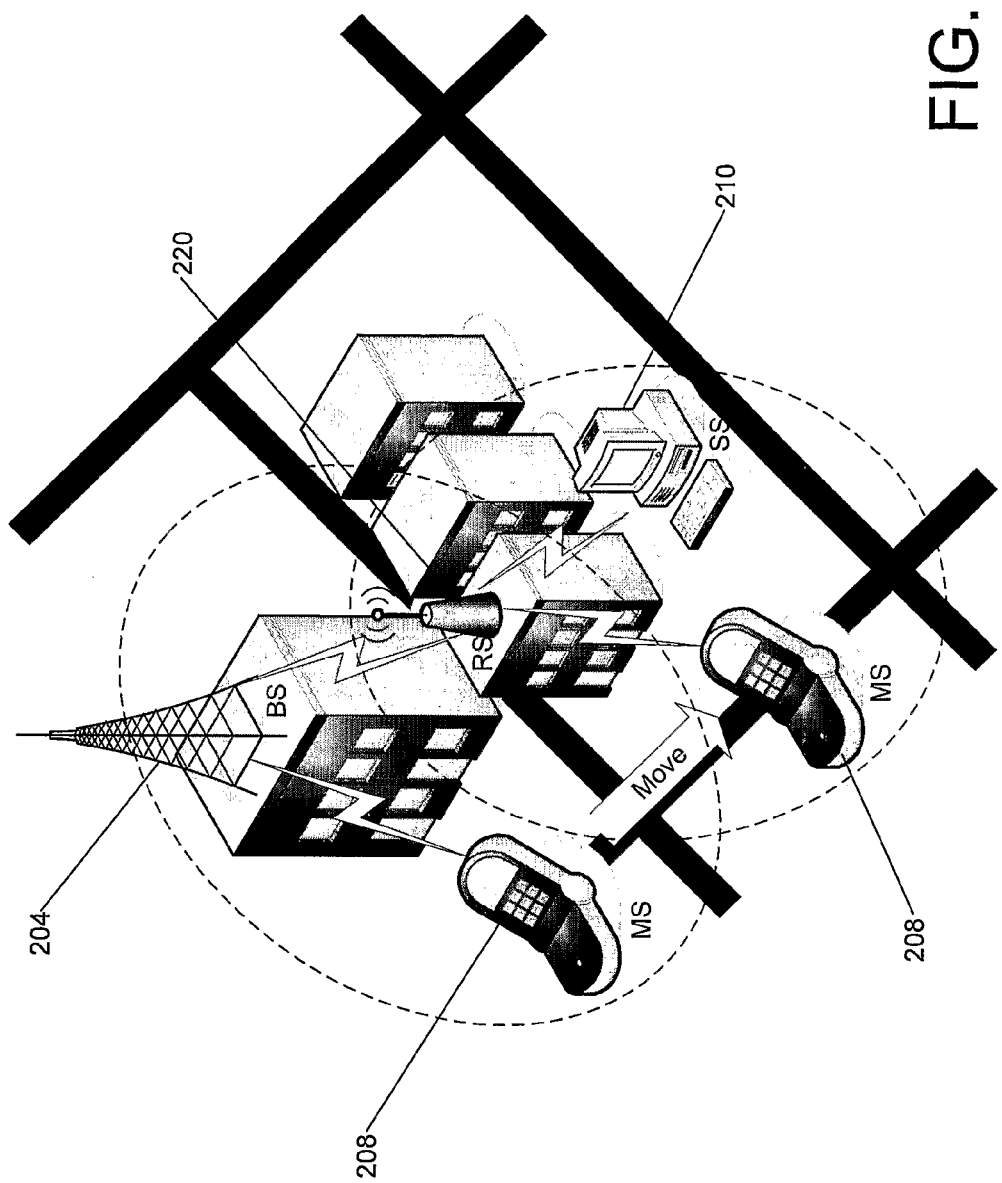
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2. Therefore, the use of relay nodes or relay stations may extend the range and improve the coverage of the cell or network. Thus, a wireless network that employs one or more relay nodes or relay stations may be an example of a multi-hop wireless network and may sometimes be referred to as a relay enhanced cell, a relay network, or the like.

Figure 3:
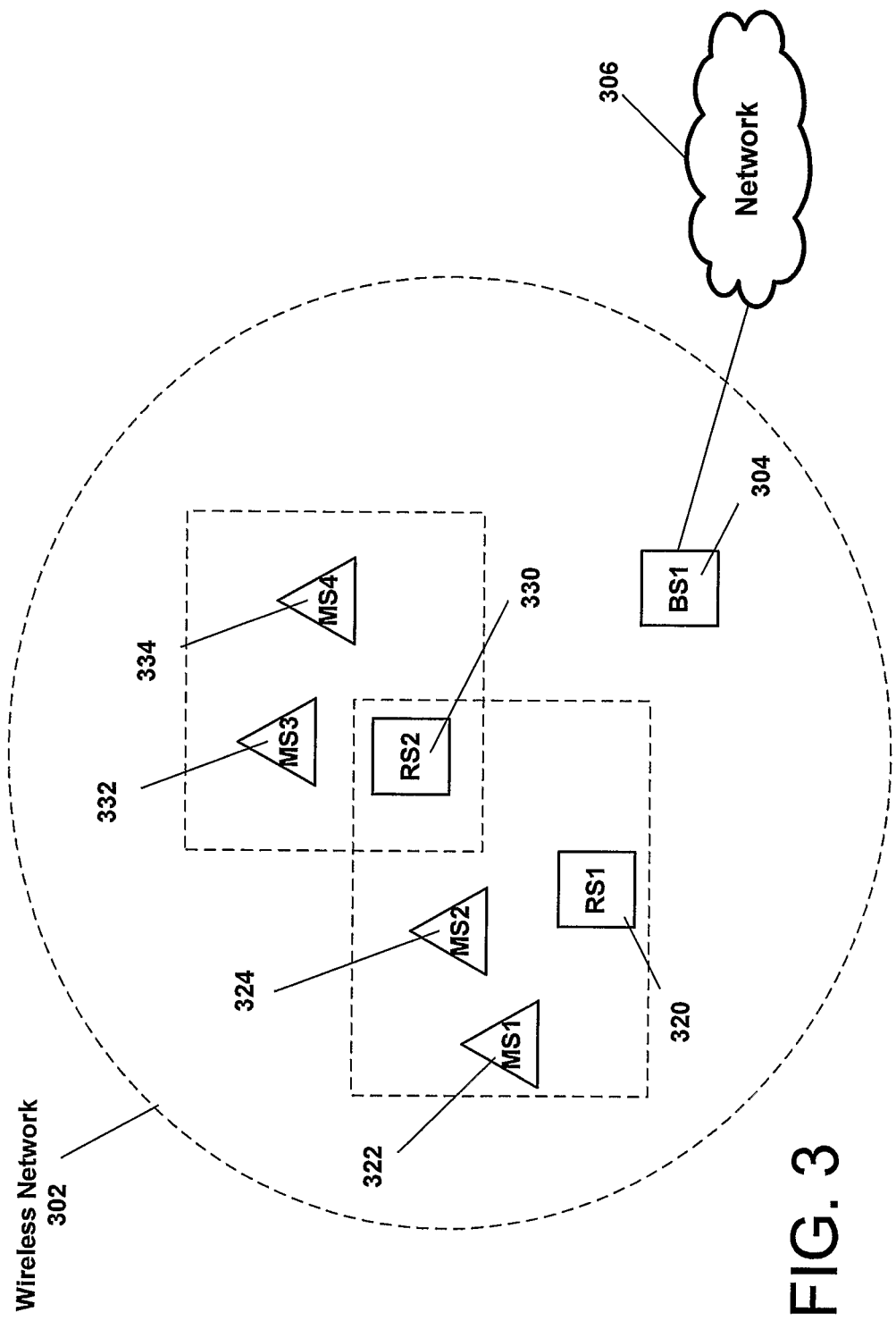
FIG. 3 is a block diagram illustrating a wireless network according to an example embodiment.

FIG. 3 is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with relay station RS1 320, and MS3 332 and MS4 334 communicating with relay station RS2 330. As shown, relay station RS2 330 also communicates with relay station RS1 320. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. The group of stations MS1 322, MS2 324, and RS2 330 may communicate with the base station BS1 304 via the relay station RS1 320. The group of stations MS3 332, MS4 334, may communicate with the base station BS1 304 via the relay station RS2 330, which communicates with the base station BS1 304 via the relay station RS1 320.

The various embodiments described herein may be applicable to a wide variety of wireless network technologies, such as, for example, WLAN (wireless local area network) networks (e.g., IEEE 802.11 type networks), IEEE 802.16 WiMAX networks, cellular networks, relay networks, multi-hop networks, 3GPP related networks including Long Term Evolution (LTE) of 3GPP, HSDPA (high speed downlink packet access), UMTS Terrestrial Radio Access Network (UTRAN), wireless networks based on orthogonal frequency division multiplexing (OFDM), orthogonal frequency division multiple access (OFDMA) or other techniques, radio networks, or other wireless networks. These are merely some example networks or technologies, and the various embodiments described herein are not limited thereto. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode, as well as an ad-hoc mode in which wireless nodes or stations may communicate directly via a peer-to-peer network, for example.

The term "wireless node" or "node," or wireless station or the like, may include, for example, a wireless mobile device, mobile station or user equipment, an access point (AP), base station or other infrastructure node, a wireless personal digital assistant (PDA), a cell phone, an 802.11 WLAN phone, a wireless mesh point, or any other wireless device. An infrastructure node may include, as examples, a base station, an access point, a relay station or relay node, a node-B, or any other infrastructure node. These are merely a few examples of the wireless devices that may be used to implement the various embodiments described herein, and this disclosure is not limited thereto.

Feedback of channel state information or channel quality information has been employed to allow a node to adjust data transmission parameters (e.g., modulation scheme, coding rate) based on the quality of the channel. This may allow higher data rates to be provided when channel conditions improve, and may allow data rates to be decreased to accommodate deteriorating channel conditions. Unfortunately, in some instances, a single channel quality value may not be sufficient to accurately reflect the conditions of complex wireless networks. For example, it may be desirable for channel quality feedback to account for or accommodate one or more complicating factors, such as the use of multi-hop networks or a number of hops in a path (e.g., of a relay network), a target block error rate (target BER) or target packet error rates, one or more applications that may have varying sensitivity to packet delay or varying delay constraints (e.g., VoIP and data or best efforts applications), different traffic classes or QOS/priority levels for different packets or flows, the use of soft frequency reuse through the use of power masks by one or more infrastructure nodes in a wireless network(s) to decrease radio interference (for example), the time varying nature of a wireless channel and how different frequencies or subcarriers may vary differently over time, and other factors. These are merely a few examples, and the disclosure is not limited by or to these factors.

According to an example embodiment, a number of different techniques are provided or described herein for feedback and link adaptation. In an example embodiment, a wireless node (e.g., user terminal or relay node) may receive data or packets, and may determine a channel quality indication (CQI) value for each of a plurality of wireless sub-channels. For example, a received packet may include signals on each of a plurality of subcarriers. Based on the received packet(s), the wireless node may determine a CQI value for each of a plurality of subcarriers. A number of different CQI values may be determined, such as a signal-to-interference and noise ratio (SINR), or other CQI value. For example, a higher SINR may typically correspond to a higher quality wireless channel at that time.

In an example embodiment, each subchannel may include a plurality (e.g., 12 or other number) of subcarriers. A CQI for a subchannel may be determined, in an example embodiment, as an average of the CQIs (e.g., average SINRs) of each of the subcarriers of a channel. Thus, a CQI value may be determined for each subchannel by taking an average CQI across the subcarriers of the channel, for example. These subcarrier CQI values may be averaged for one time slot or 1 sample, for example, to determine a CQI value for a subchannel. Other techniques may be used as well.

Figure 4:
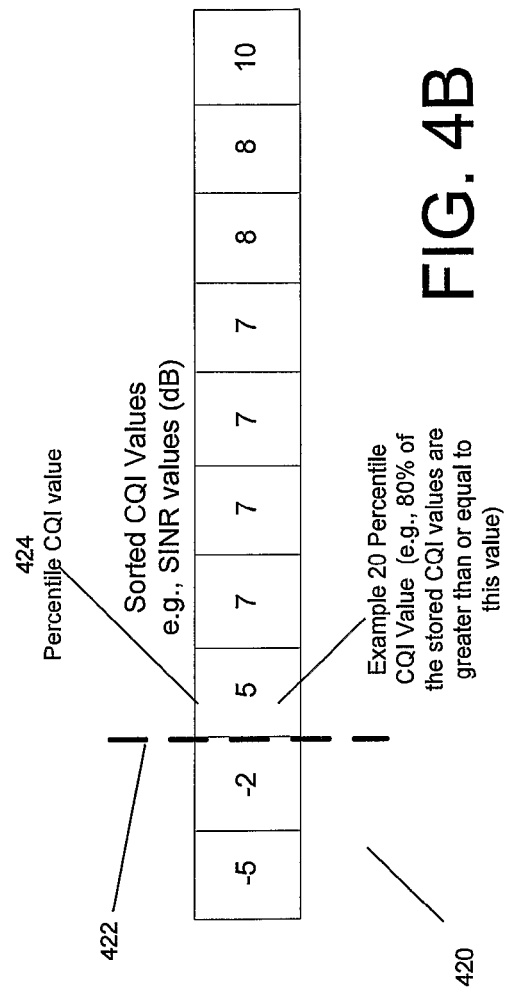
FIG. 4A is a diagram illustrating channel quality indication (CQI) values stored in memory of a wireless node according to an example embodiment.
FIG. 4B is a diagram illustrating the selection or determination of a percentile CQI value according to an example embodiment.

FIG. 4A is a diagram illustrating CQI values stored in memory of a wireless node. In an example embodiment, a wireless node may determine CQI values for one or more sub-channels (e.g., subcarriers) based on one or more received packets. The determined or calculated CQI values may be stored in the memory of the wireless node, as shown in FIG. 4A. For example, CQI values 1, 2, 3, ... Z may be stored in memory or buffer for sub-channels 1, 4, 8, and N, respectively. The buffer or memory may store in memory a CQI value for each of a plurality of sub-channels, for example. Alternatively, an average CQI value may be calculated and stored for two or more sub-channels, for example.

In addition, for each CQI value, a time stamp (or time indication) may be stored in memory to indicate how current or fresh (or stale) a CQI value may be. The time stamp values may include, as an example, a time stamp 1, time stamp 2, time stamp 3 ... time stamp 4 for CQI values 1 ... Z. The time stamp may indicate, for example, the approximate time that the packet was received upon which the CQI was calculated or determined, or the superframe number in which the packet or frame was received, upon which the CQI value was determined. This may allow the wireless node to detect and discard relatively stale or relatively old CQI values from memory (e.g., discard CQI values after 500 ms, or having time stamps older than a threshold value, such as older than 500 ms), or discard CQI values received more than 20 frames (or 20 superframes) ago, for example (e.g., may keep only the X most recent SINR or CQI values for each subchannel). Or, for example, each CQI value (e.g., each SINR value) may be discarded after it has expired (e.g., after 500 ms), or may keep only the 10 most recent SINR or CQI values, as another example. This may allow more current (more accurate) channel state or channel quality information to be maintained by the wireless node, since channel state for each channel or subcarrier may vary substantially over time.

In an example embodiment, the wireless node may calculate or determine a percentile CQI value based on a current set of CQI values. As noted, any of the CQI values that are stale (e.g., that have expired or that have time stamps older than a threshold) may be discarded, leaving a set of (relatively) current CQI values in memory. The threshold time may be measured in time (e.g., seconds), as a number of frames, sub-frames, superframes, or some other measurement or indication, and is not limited to a time reference (e.g., seconds). The percentile CQI value may be calculated or determined based on the set of current CQI values, for example. The percentile CQI value may refer to (or may include) a minimum CQI value for the identified percentile. For example, a 20 (or $20^{th}$) percentile CQI value may indicate the minimum CQI value for the top 80% of the current CQI values.

Figure 10:
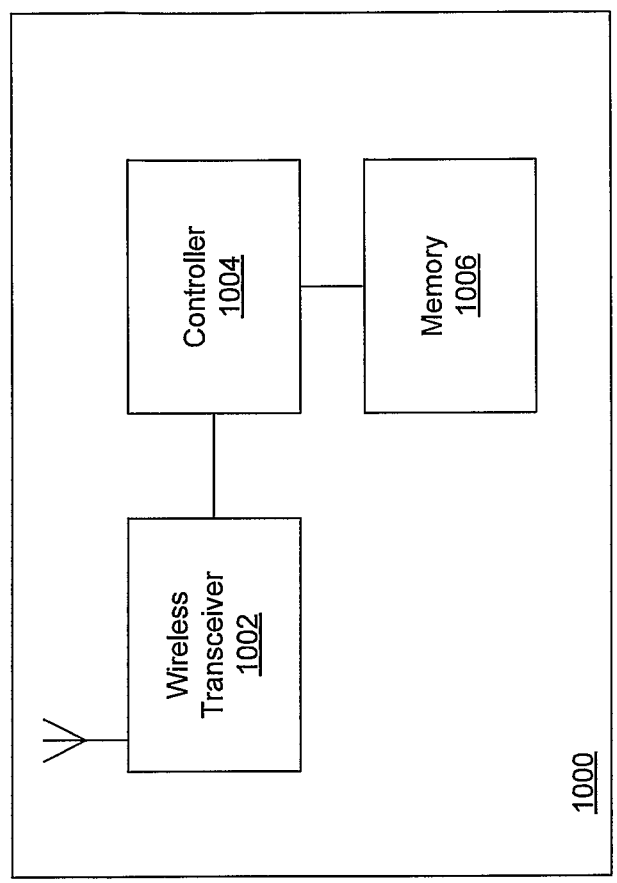
FIG. 10 is a block diagram illustrating an apparatus that may be provided in a wireless node according to an example embodiment.

FIG. 4B is a diagram illustrating the selection or determination of a percentile CQI value according to an example embodiment. In this example embodiment, the CQI values are SINR values, although this is merely an example. Referring to FIG. 4B, 10 current CQI values are stored in a memory of a wireless node. In this illustrative example, the CQI values (420) may be sorted in ascending order (lowest to highest CQI values), with the lowest CQI value (SINR in this example) being −5 dB. The highest CQI value (highest SINR in this example) stored in memory (as shown in FIG. 4B) is 10 dB. The other eight CQI values (SINR values) are between −5 dB and 10 dB. The line 422 may indicate the boundary of the 20 (or $20^{th}$) percentile for the sorted CQI values. As shown in FIG. 4B, there are 10 CQI values in this example. If an infrastructure node requested the percentile CQI value for the 20 (or $20^{th}$) percentile, then the wireless node may sort the CQI values, and select the minimum CQI value that is in the top (or highest) 80% of the CQI values. Thus, in this example, the 8 highest of the ten CQI values are greater than or equal to 5 dB (these 8 CQI values are shown to the right of line 422). Thus, the 20 (or $20^{th}$) percentile CQI value is 5 dB in this example. For example, the percentile CQI may be the percentile CQI value for a best-M sub-channels. Or the percentile CQI may be, for example, a minimum CQI of the best-M CQI values.

The percentile CQI value may be transmitted to a requesting infrastructure node, e.g., base station, access point, relay node or relay station, or the like. The infrastructure node may then, for example, determine or adjust one or more data transmission parameters (e.g., modulation scheme or coding rate) for transmitting data to the (reporting) wireless node, based on the percentile CQI value.

In another example embodiment, the sub-channels or the CQI values for the various sub-channels may be placed into two or more groups, and a percentile CQI value may be calculated or determined for each group. For example, the sub-channels may be divided into two or more groups, and a percentile CQI value may be determined and reported for each group of subchannels. Different groups of sub-channels may include, for example:

1) a best-M group of sub-channels, and 2) other (non-best-M) sub-channels;
1) a group of sub-channels used to transmit using a first power level based on a power mask; and 2) a group of sub-channels used to transmit data using a second power level based on a power mask; 3) a third group of sub-channels used to transmit data using a third power level using a power mask, etc. Any number of groups may be used, e.g., two, three, four, or more.
1) a group of sub-channels associated with (e.g., used to transmit data for) at least one of: a first flow, a first traffic priority or Quality of Service (QoS) or a first application, and 2) a group of sub-channels associated with (e.g., used to transmit data for) at least one of: a second flow, a second traffic priority or Quality of Service (QoS) or a second application. For example, packets having a same QoS, from a same flow, or from a same application may have a common delay constraints. For example, all VoIP packets have very low delay requirements. Thus, it may be advantageous to report out the group of sub-channels that provide VoIP traffic so that a same or similar data transmission parameters (coding rate, modulation scheme, etc.) may be applied to VoIP subchannels (assuming other variables are the same, for example).

Many other groups of subchannels may be provided. In an example embodiment, a percentile CQI value may be determined and reported to an infrastructure node for each group of sub-channels, for example. This may allow, for example, the infrastructure node, to separately assign data transmission parameters for the sub-channels associated with each group.

Figure 5:
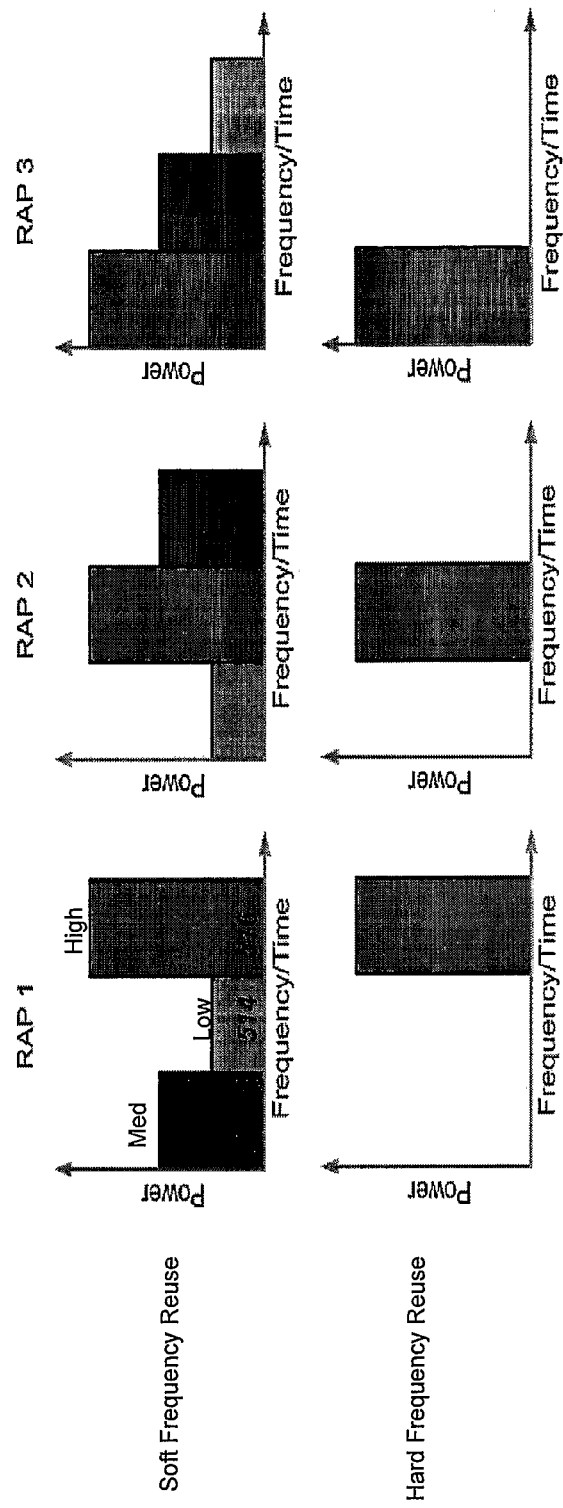
FIG. 5 is a diagram illustrating transmission power levels for infrastructure nodes to provide soft frequency reuse.

FIG. 5 is a diagram illustrating transmission power levels for infrastructure nodes to provide soft frequency reuse. A different transmission power level (e.g., low, medium, high transmission power) may be assigned to each radio access point (or infrastructure node), e.g., to facilitate soft frequency reuse. For example, one set of sub-channels (512) may be assigned to a medium transmission power for a radio access point 1 (RAP1); another set of sub-channels or subcarriers (514) may be assigned to a low transmission power level for RAP1; and yet another set of subcarriers (516) may be assigned to a high transmission power level of RAP1. The transmission power levels may be different for each RAP or infrastructure node, and may change over time. For example, a higher power transmission may have a higher likelihood of being transmitted without error, and thus, a base station or infrastructure node may, for example, assign a higher modulation scheme for a higher transmission power (if other factors are the same). RAP, or radio access points, may be infrastructure nodes, either base stations or relay nodes, for example.

Figure 6:
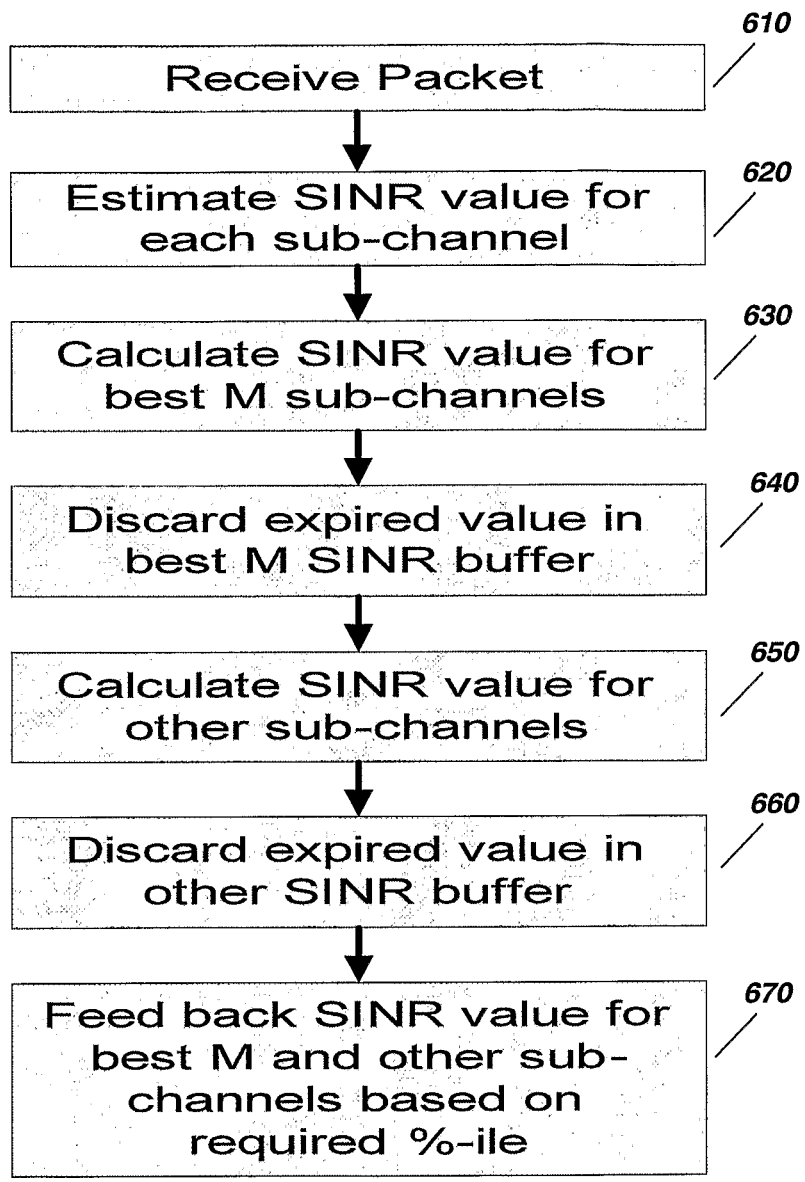
FIG. 6 is a flow chart illustrating operation of a wireless node according to an example embodiment.

FIG. 6 is a flow chart illustrating operation of a wireless node according to an example embodiment. At 610, a packet is received at a wireless node. The packet may, for example, include signals on a plurality of sub-channels. At 620, a CQI value (or SINR value) may be determined or estimated for each sub-channel, e.g., based on a received packet. At 630, the CQI (e.g., SINR) values may be determined for the best-M subchannels. At 640, stale (or old) SINR values may be discarded from the buffer or memory for the best-M subchannels. At 650, SINR valued are calculated for other (non-best-M) subchannels (e.g., one SINR for each non-best M subchannel). At 660, stale (or old) SINR values may be discarded from the buffer or memory for other than the best-M subchannels. At 670, the wireless node may send or feed back the SINR value for the best-M and the other subchannels based on the requested percentile CQI (or percentile SINR).

Referring to FIG. 6, for each received packet the mobile station/user terminal or RN (relay node) may estimate or determine the SINR value on each sub-carrier. Then these SINR values may be used to calculate the average SINR values for the sub-channels in two groups (best-M and other):

$$SINR_{bestM,dB} = 10\log10\left[\left(\frac{1}{P}\sum_{p=1}^{P}(SINR_p)\right)\right]$$

$$SINR_{other,dB} = 10\log10\left[\left(\frac{1}{P}\sum_{k=1}^{P}(SINR_k)\right)\right]$$

where p estimated SINR of sub-carrier part of best M sub-channels

P number sub-carriers in sub-channel k estimated SINR of sub-carrier not part of best M sub-channels K number of sub-carriers in sub-channel With reference to FIG. 4B, the average SINR values may be put into separate sorted buffers for the best M sub-channels and the other sub-channels, respectively. Further, a time stamp (e.g. super frame number) may be put into the buffer together with the SINR values. This time stamp is then used to determine SINR values to be discarded when they expire, e.g. after 500 ms. The serving RAP (or serving BS or AP or RN, which may be the infrastructure node associated with the wireless node/mobile station or user terminal) may inform the user terminal or mobile station which percentile of the sorted SINR values it should feed back or return (e.g., see request message in table 1, indicating percentile value).

The RAP or infrastructure node, may use this SINR value (or percentile CQI value) to select the modulation and coding scheme for example. FIG. 4B may illustrate an example of a best M sub-channel buffer with 10 SINR values in it. The line 422 may indicate the 80 (or $80^{th}$) percentile. The next greatest SINR value, in this case 5 dB is fed back to the RAP or infrastructure node, modulation scheme and coding rate for the best M sub-channels in the next transmissions. Further, in a similar way the SINR value of the other sub-channels is determined and fed back to the RAP. The RAP may be, for example, the closest uplink infrastructure node to the mobile node or user terminal, and may be serving the mobile node. Once the SINR value has been obtained (percentile CQI), any known scheme for the link adaptation can be used, e.g. link adaptation based on mutual information per bit, as an example.

A number of different options or variations may be applied, for example:

The duration until when the CQI or SINR values expire may be set to a fixed value, e.g. 500 ms or it can depend or vary based on the mobile speed or on the interference coordination scheme used in the network (e.g. if adaptive soft reuse is used, the duration can depend on the update frequency of the power masks).

The size of the buffer can be fixed to e.g., 100 SINR (or CQI) entries or it may be implementation specific or a system parameter.

The wireless node or user terminal may store in memory or buffer, instead of an average SINR value per sub-channel, an average value of the SINR of a combination of sub-channels into the buffer, e.g. 1 average SINR value of all sub-channels part of the best M on which the packet was received and 1 average SINR value of all sub-channels not part of the best M on which the packet was received.

The mobile terminal or subscriber station can feed back or send every SINR value to the BS or infrastructure node, and the BS can keep the buffer.

In the case of soft-frequency reuse, with e.g., 3 power steps, a separate buffer can be used for each power step. If the system uses a large amount of power steps compared to the number of sub-channels, it may become difficult to collect a sufficient amount of SINR values for each phase or power step. In such systems several power steps might use the same SINR value. In the following an example embodiment is briefly described for a system with 7 power steps:

The best transmission opportunities may be for power steps where high power is assigned to the RAP. Therefore the wireless node or user terminal may use a single SINR (CQI) buffer for the power step with the highest power.

The wireless node may then combine the power steps of the second and third highest power value and uses a single SINR buffer for those.

The remaining 4 power steps with the lowest power assigned may be combined and use a single SINR buffer for the link adaptation.

An infrastructure node may send a request message to a wireless node requesting a CQI percentile value for one or more groups of sub-channels. Table 1 below illustrates an example format for such a request message. The request message may include a message ID to identify the message as a request message, e.g., requesting a percentile CQI value. A CQI percentile field may indicate the percentile that should be reported, such as 30 (or $30^{th}$) percentile (001), 20 percentile (010), 10 (or $10^{th}$) percentile (011), and 5 percentile (100), request a percentile CQI value for one group of sub-channels. The values of 101, 110 and 111 in the CQI percentile field may request a percentile CQI value for two group of sub-channels. For example, the request message may request CQI percentile values for 30 percentile for one group and 5 percentile for another group. The value 110 may indicate a request for a 30 and 10 percentile CQIs for groups of sub-channels, while the value 111 may indicate a request for 20 and 5 percentile CQIs for groups of sub-channels.

TABLE 1

| Message ID | CQI Percentile Field | Percentile to report |
| --- | --- | --- |
| Identifies the message | 000 | Reserved |
| | 001 | 30 percentile |
| | 010 | 20 percentile |
| | 011 | 10 percentile |
| | 100 | 5 percentile |
| | 101 | 30 and 5 percentile |
| | 110 | 30 and 10 percentile |
| | 111 | 20 and 5 percentile |

The percentile that is used for the link adaptation can be set according to the target packet error rate at which the system wants to operate and it can be set differently for different flows. Typically for a real time service the target packet error rate will be lower than for a best effort service. Moreover, if the traffic has to be sent over multiple hops, then the target packet error rate should be even lower (to avoid the costly retransmissions, if possible). Therefore a RAP can request the next RN or UT to report percentiles according to the number of hops and the traffic requirements. An example of such a message is illustrated in Table 1.

Depending on the network implementation the RN or BS can be aware of the network topology. Thus, the RN or BS may know how many hops the packet will have to pass in the mesh network. In one example, for two hops it may use HARQ (Hybrid ARQ) (which allows for retransmission of coded data blocks that are uncorrectable) when forwarding in the backhaul system. For 3 or more hops, HARQ may, for example, be switched off and it uses more robust link adaptation (more robust modulation and coding to reduce possibility of errors). Thus, it will request the user to feed back different SINR percentiles depending on the HARQ settings, e.g. amount of retransmissions.

In another network implementation each delay sensitive packets get a timestamp when they arrive at the BS (in the DL or downlink direction) or at the first RN (in the UL or uplink direction). Thus, the RNs may typically know when forwarding the packet how much time it has spent already in the network. Depending on that information and on the number of hops yet to reach, the RN decides to deactivate HARQ (or change the number of retransmissions permitted) and to use a more robust link adaptation. Thus, again it will request the user to feed back different SINR percentiles.

A more advanced implementation could be devised, where more QoS classes are used, with increasing delay requirements. Then, more flexibility could be given to the RNs in the backhaul system. Following the same procedure than described above they decide to disable the per-link HARQ and choose the appropriate SINR percentile independently for each QoS class.

Next to delay sensitive traffic like VoIP, also traffic sensitive to delay jitters (e.g. streaming) is an important QoS class. The same mechanisms can be applied also to this QoS class to reduce the delay jitter of such traffic streams.

Figure 7:
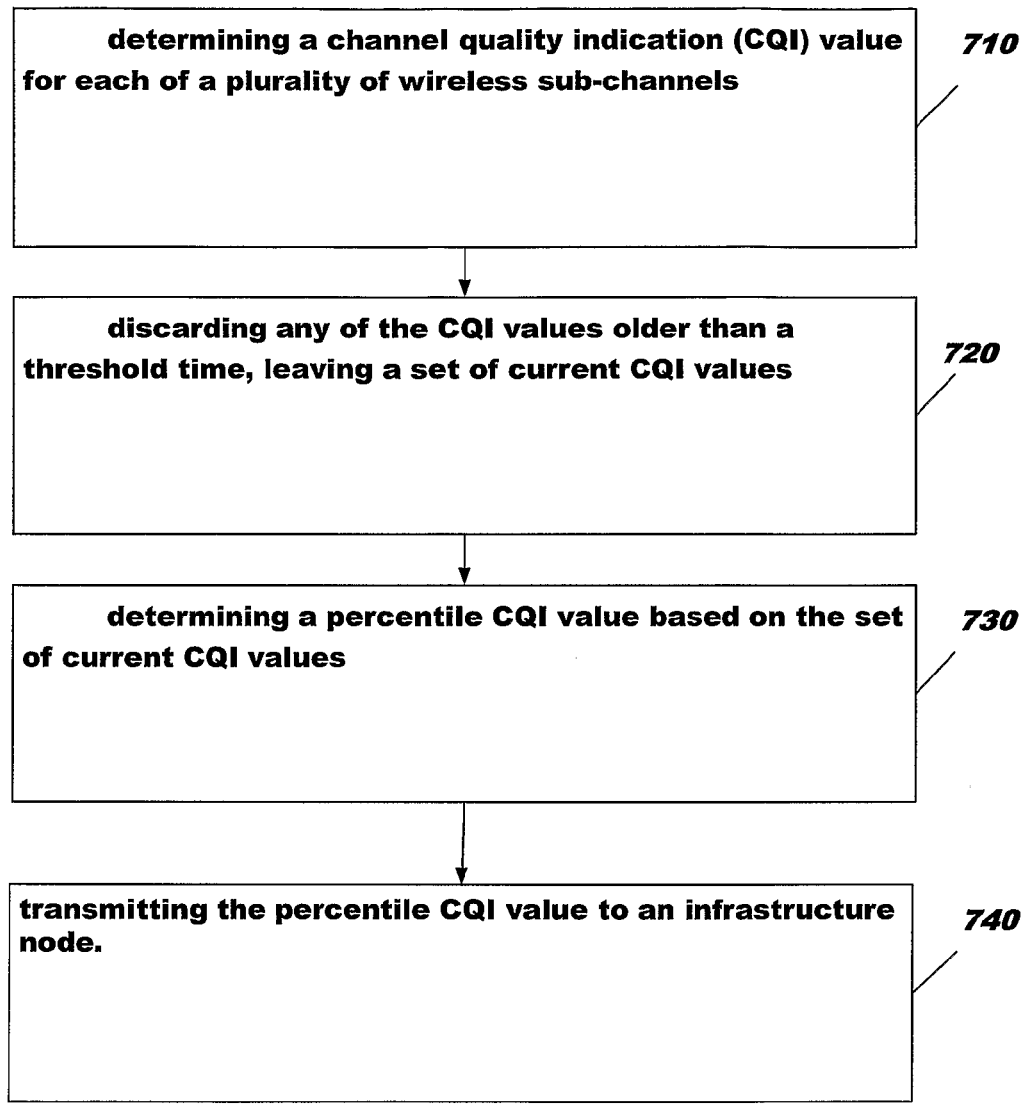
FIG. 7 is a flow chart illustrating operation of a wireless node according to an example embodiment.

FIG. 7 is a flow chart illustrating operation of a wireless node according to an example embodiment. Operation 710 may include determining a channel quality indication (CQI) value for each of a plurality of wireless sub-channels. Operation 720 may include discarding any of the CQI values older than a threshold time, leaving a set of current CQI values. Operation 730 may include determining a percentile CQI value based on the set of current CQI values. Operation 740 may include transmitting the percentile CQI value to an infrastructure node.

In an example embodiment, the determining (710, FIG. 7) a channel quality indication (CQI) for each of a plurality of wireless sub-channels may include: receiving one or more packets, each packet including signals on a plurality of sub-channels; and determining a channel quality indication (CQI) value for each of a plurality of wireless sub-channels based on the one or more received packets.

The method of FIG. 7 wherein the determining (710) a CQI value for each of a plurality of wireless sub-channels may include determining a signal-to-interference and noise ratio (SINR) value for each of a plurality of subcarriers.

The method of FIG. 7 wherein the discarding (720) may include: determining a time-stamp for each of the channel quality indication (CQI) values, storing in a memory the CQI values for each of the plurality of sub-channels, and discarding from the memory any of the CQI values having a time stamp older than a threshold time, leaving a set of current CQI values.

The method illustrated in FIG. 7, wherein the determining a percentile CQI value (730) may include: sorting the set of current CQI values, and selecting the percentile CQI value based on the sorted set of current CQI values.

The method illustrated in FIG. 7, wherein the determining a percentile CQI value (730) may include: storing the CQI values for each of the plurality of sub-channels in memory, sorting the set of current CQI values, and selecting the percentile CQI value based on the sorted set of current CQI values.

The method of FIG. 7 wherein the determining a percentile CQI value based on the set of current CQI values (730) may include determining a minimum CQI value for a best-M sub-channels.

The method wherein the determining (730) a channel quality indication (CQI) value may include determining an average channel quality indication (CQI) value for each of a plurality of groups of wireless sub-channels.

In another example embodiment, an apparatus may include a controller and a wireless transceiver. The controller may be configured to: determine a channel quality indication (CQI) value for each of a plurality of wireless sub-channels; discard any of the CQI values older than a threshold time, leaving a set of current CQI values; determine a percentile CQI value based on the set of current CQI values; and transmit the percentile CQI value to an infrastructure node.

Figure 8:
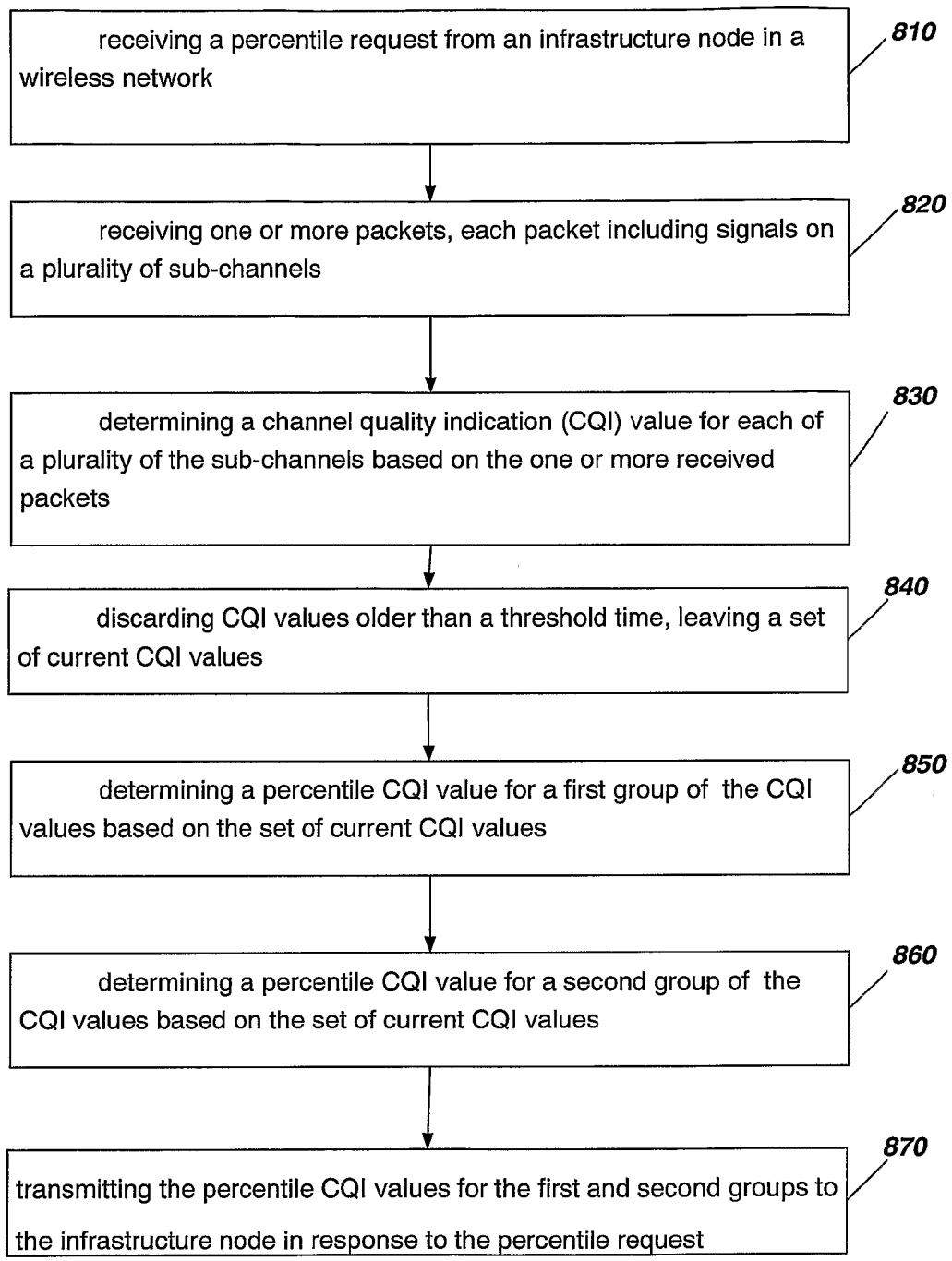
FIG. 8 is a flow chart illustrating operation of a wireless node according to another example embodiment.

FIG. 8 is a flow chart illustrating operation of a wireless node according to another example embodiment. Referring to FIG. 8, operation 810 may include receiving a percentile request from an infrastructure node in a wireless network. Operation 820 may include receiving one or more packets, each packet including signals on a plurality of sub-channels. Operation 830 may include determining a channel quality indication (CQI) value for each of a plurality of the sub-channels based on the one or more received packets. Operation 840 may include discarding CQI values older than a threshold time, leaving a set of current CQI values. Operation 850 may include determining a percentile CQI value for a first group of the CQI values (or for a first group of the subchannels) based on the set of current CQI values. Operation 860 may include determining a percentile CQI value for a second group of the CQI values (or for a second group of the subchannels) based on the set of current CQI values. Operation 870 may include transmitting the percentile CQI values for the first and second groups to the infrastructure node in response to the percentile request.

The flow chart of FIG. 8 may further include that the determining (830) a CQI value for each of a plurality of wireless sub-channels may include determining a signal-to-interference and noise ratio (SINR) value for each of a plurality of subcarriers.

The flow chart of FIG. 8 wherein determining a percentile CQI value for a first group of the CQI values may include determining (850) a percentile CQI value for a best-M sub-channels based on the set of current CQI values, and wherein determining (860) a percentile CQI value for the second group of the CQI values comprises determining a percentile CQI value for other than the best-M sub-channels.

The flow chart of FIG. 8, wherein determining a percentile CQI value (850) for a first group of the CQI values may include determining a percentile CQI value for a subset of the current CQI values used for a first transmission power level from a power mask, and wherein determining a percentile CQI value (860) for a second group of the CQI values comprises determining a percentile CQI value for a subset of the current CQI values used for a second transmission power level from the power mask.

The flow chart of FIG. 8, wherein determining a percentile CQI value for a first group (850) of the CQI values may include determining a percentile CQI value for a subset of the current CQI values associated with at least one of: a first flow, a first traffic priority level/QoS class, and/or a first application; and wherein determining a percentile CQI value (860) for a second group of the CQI values may include determining a percentile CQI value for a subset of the current CQI values associated with at least one of: a second flow, a second traffic priority level/QoS class, and/or a second application.

An apparatus may include a controller and a wireless transceiver. The controller may be configured to: receive a percentile request from an infrastructure node in a wireless network; receive one or more packets, each packet including signals on a plurality of sub-channels; determine a channel quality indication (CQI) value for each of a plurality of the sub-channels based on the one or more received packets; discard CQI values older than a threshold time, leaving a set of current CQI values; determine a percentile CQI value for a first group of the CQI values based on the set of current CQI values; determine a percentile CQI value for a second group of the CQI values based on the set of current CQI values; and transmit the percentile CQI values for the first and second groups to the infrastructure node in response to the percentile request.

Figure 9:
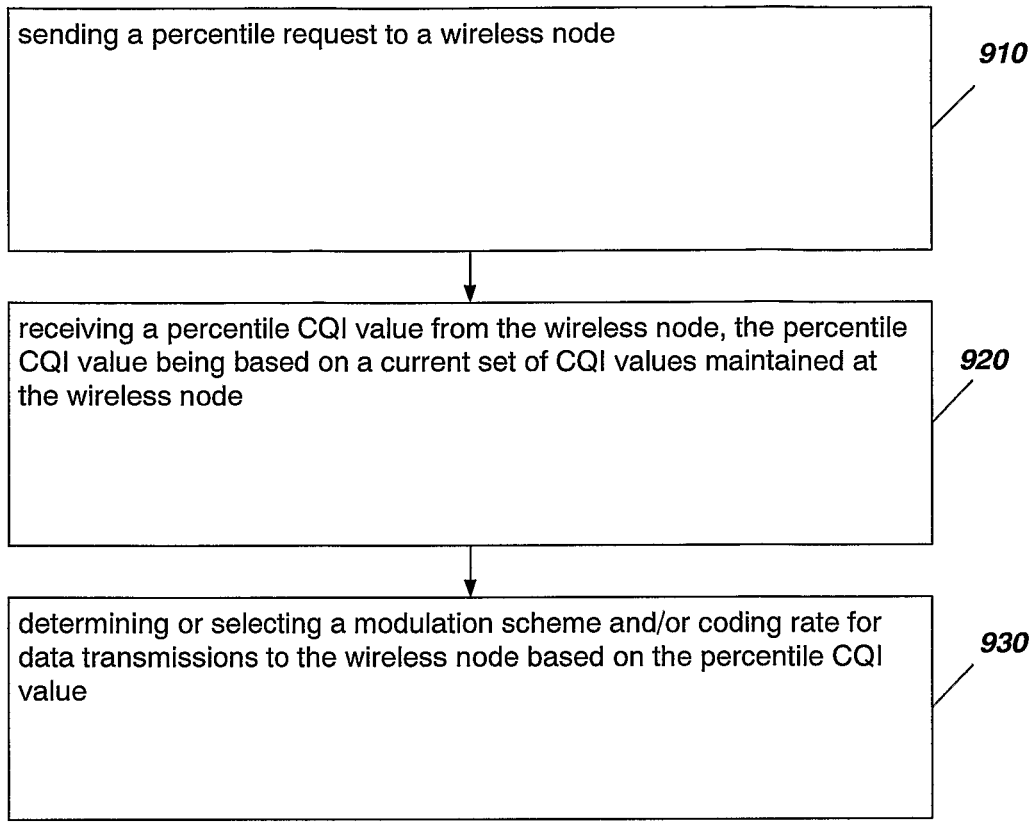
FIG. 9 is a flow chart illustrating operation of a wireless node, such as an infrastructure node, according to an example embodiment.

FIG. 9 is a flow chart illustrating operation of a wireless node, such as an infrastructure node, according to an example embodiment. Operation 910 may include sending a percentile request to a wireless node. Operation 920 may include receiving a percentile CQI value from the wireless node, the percentile CQI value being based on a current set of CQI values maintained at the wireless node, and operation 930 may include determining or selecting a modulation scheme and/or coding rate for data transmissions to the wireless node based on the percentile CQI value.

The flow chart of FIG. 9 may further include sending, or controlling an infrastructure node to send, data to the wireless node using the selected modulation scheme and/or coding rate.

The flow chart of FIG. 9 wherein the receiving (920) a percentile CQI value may include receiving a percentile CQI value from the wireless node for a first group of the current CQI values (or for a first group of subchannels), and receiving a percentile CQI value from the wireless node for a second group of the current CQI values (or for a second group of the subchannels).

The flow chart of FIG. 9 wherein the receiving a percentile CQI value (920) may include receiving a percentile CQI value for a subset of the current CQI values maintained by the wireless node that are associated with at least one of: a first flow, a first traffic priority level/QoS class, and/or a first application; and receiving a percentile CQI value for a subset of the current CQI values maintained by the wireless node that are associated with at least one of: a second flow, a second traffic priority level/QoS class, and/or a second application.

The flow chart of FIG. 9 wherein the receiving (920) a percentile CQI value may include: receiving a percentile CQI value for a subset of the current CQI values maintained by the wireless node associated with the transmission of data to the wireless node at a first transmission power level of a power mask (or receiving a percentile CQI value for a group of subchannels used for transmission of data to the wireless node at a first transmission power level), and receiving a percentile CQI value for a subset of the current CQI values maintained by the wireless node associated with the transmission of data to the wireless node at a second transmission power level of the power mask (or receiving a percentile CQI value for a group of subchannels used for transmission of data to the wireless node at a second transmission power level).

The flow chart of FIG. 9 wherein the receiving a percentile CQI value may include: receiving a percentile CQI value for a best-M of sub-channels based on the set of current CQI values from the wireless node, and receiving a percentile CQI value for other than the best-M sub-channels.

The flow chart of FIG. 9 wherein the determining or selecting a modulation scheme and/or coding rate may include: determining or selecting a modulation scheme and/or coding rate for data transmissions to the wireless node based on the percentile CQI value and based on one or more of the following: a delay constraint or delay limitation for data transmitted to the wireless node, an application at the wireless node that is receiving packets and a sensitivity to delay of the application, a target error rate or target block error rate, and/or a number of hops in a communication path between a base station and the wireless node.

In another example embodiment, an apparatus may include a controller and a wireless transceiver, the controller configured to: send a percentile request to a wireless node; receive a percentile CQI value from the wireless node, the percentile CQI value being based on a current set of CQI values maintained at the wireless node; and determine or select a modulation scheme and/or coding rate for data transmissions to the wireless node based on the percentile CQI value.

Therefore, according to an example embodiment, a link adaptation and feedback scheme is provided that may, for example, adapt to the bursty and changing interference situation in an OFDMA wireless network. This scheme may also with work with interference coordination schemes such as soft frequency reuse, where power masks are used to coordinate the interference between RAPs. Secondly the link adaptation and feedback scheme may also take QoS aspects and multi-hop communication into account.

As can be seen from FIG. 5, the radio access points (RAPs) may use different power levels in different phases. The interference situation of the mobile terminals served by the RAPs may typically change accordingly. The interference may not only depend on the power level used by the serving RAP but also on the power levels used by other interfering RAPs. Therefore a link adaptation based for example on a single SINR (or single CQI) value, at least in some cases, may not be sufficient to determine the best modulation and coding scheme for every phase. Even if soft reuse is not used, the interference may at least in some cases be bursty and a single SINR value may be inadequate in such a situation, for example.

To exploit these variations and to achieve multi-user scheduling gain, the best M feedback scheme, or other feedback scheme may be used. In Best-M technique, for example, each user (or each user terminal/wireless node) may report the best M sub-channels (highest SINR) to the serving RAP and the RAP will try to allocate these M sub-channels to the user. Thus, given a sufficient amount of users and the possibility to delay packet transmissions, each user may typically, at least in some situations, obtain packets on its best M sub-channels. Additionally to the best M sub-channels the user terminals feed back one channel quality indicator CQI, e.g. SINR value that is used for link adaptation on these sub-channels. The position of the sub-channels may vary over time and may be signaled to the RAP. The SINR value is typically the averaged value over this varying set of sub-channels.

However in reality, the number of users might be lower and QoS constraints may in some cases require that delay sensitive traffic is scheduled also on other than the best M sub-channels. Therefore, according to an example embodiment, the users not only feed back a CQI value, e.g. SINR for the best M sub-channels but also a second CQI value for the other sub-channels.

FIG. 10 is a block diagram illustrating an apparatus 1000 that may be provided in a wireless node according to an example embodiment. The wireless node (e.g., wireless station or AP or infrastructure node) may include, for example, a wireless transceiver 1002 to transmit and receive signals, a controller 1004 to control operation of the station and execute instructions or software, and a memory 1006 to store data and/or instructions.

Controller (or processor) 1004 may be programmable and capable of executing software or other instructions stored in memory or on other computer media to perform the various tasks and functions described herein.

In addition, a storage medium may be provided that includes stored instructions, when executed by a controller or processor that may result in the controller 604, or other controller or processor, performing one or more of the functions or tasks described herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

We claim:

1. A method comprising:
   determining a channel quality indication (CQI) value for each of a plurality of wireless sub-channels;
   discarding any of the CQI values older than a threshold time, leaving a set of current CQI values;
   determining a minimum CQI value for a first group of CQI values from the set of current CQI values based on a required percentile;
   determining a minimum CQI value for a second group of the CQI values from the set of current CQI values based on the required percentile; and
   transmitting the minimum CQI values for the first and second groups to an infrastructure node in response to a percentile request to indicate the channel quality of the wireless sub-channels according to the required percentile,
   wherein the determining the minimum CQI value for the first and second groups from the set of current CQI values based on the required percentile comprises:
   determining a minimum CQI value for the first and second groups that is in a highest percentile of the set of current CQI values.

2. The method of claim 1 wherein the determining a CQI value for each of the plurality of wireless sub-channels comprises:
   receiving one or more packets, each packet including signals on a plurality of sub-channels; and
   determining the CQI value for each of the plurality of wireless sub-channels based on the one or more received packets.

3. The method of claim 1 wherein the determining a CQI value for each of the plurality of wireless sub-channels comprises determining a signal-to-interference and noise ratio (SINR) value for each of a plurality of subcarriers.

4. The method of claim 1 wherein the discarding comprises:
   determining a time-stamp for each of CQI values;
   storing in a memory the CQI values for each of the plurality of sub-channels; and
   discarding from the memory any of the CQI values having a time stamp older than a threshold time, leaving a set of current CQI values.

5. The method of claim 1 wherein the determining the minimum CQI value for the first and second group comprises:
   sorting the set of current CQI values; and
   selecting the minimum CQI value for the first and second groups based on the sorted set of current CQI values.

6. The method of claim 1 wherein the determining the minimum CQI value for the first and second groups comprises:
   storing the CQI values for each of the plurality of sub-channels in memory;
   sorting the set of current CQI values; and
   selecting the minimum CQI value for the first and second groups based on the sorted set of current CQI values.

7. The method of claim 1 wherein the determining the minimum CQI value for the first and second groups based on the set of current CQI values comprises determining the minimum CQI value for the first and second groups for a best-M sub-channels.

8. The method of claim 1 wherein the determining a CQI value comprises determining an average CQI value for each of a plurality of groups of wireless sub-channels.

9. An apparatus comprising a controller and a wireless transceiver, the controller configured to:
   determine a channel quality indication (CQI) value for each of a plurality of wireless sub-channels;
   discard any of the CQI values older than a threshold time, leaving a set of current CQI values;
   determine a minimum CQI value for a first group of CQI values from the set of current CQI values based on a required percentile;
   determine a minimum CQI value for a second group of CQI values from the set of current CQI values based on the required percentile; and
   transmit the minimum CQI values for the first and second groups to an infrastructure node in response to a percentile request to indicate the channel quality of the wireless sub-channels according to the required percentile,
   wherein the determined minimum CQI value for the first and second groups from the set of current CQI values based on the required percentile comprises:
   determining a minimum CQI value for the first and second groups that is in a highest percentile of the set of current CQI values.

10. A method comprising:
    receiving a percentile request from an infrastructure node in a wireless network;
    receiving one or more packets, each packet including signals on a plurality of sub-channels;
    determining a channel quality indication (CQI) value for each of a plurality of the sub-channels based on the one or more received packets;
    discarding CQI values older than a threshold time, leaving a set of current CQI values;
    determining a minimum CQI value for a first group of the CQI values from the set of current CQI values based on a required percentile;
    determining a minimum CQI value for a second group of the CQI values from the set of current CQI values based on the required percentile; and
    transmitting the minimum CQI values for the first and second groups to the infrastructure node in response to the percentile request to indicate the channel quality of the wireless sub-channels according to the required percentile.

11. The method of claim 10 wherein the determining the minimum CQI value for each of the plurality of wireless sub-channels comprises determining a signal-to-interference and noise ratio (SINR) value for each of a plurality of sub-carriers.

12. The method of claim 10, wherein the determining the minimum CQI value for the first group of the CQI values comprises determining a minimum CQI value for a best-M of sub-channels based on the set of current CQI values; and
    wherein the determining the minimum CQI value for the second group of the CQI values comprises determining a minimum CQI value for other than the best-M sub-channels.

13. The method of claim 10, wherein the determining the minimum CQI value for the first group of the CQI values comprises determining a minimum CQI value for a subset of the current CQI values used for a first transmission power level from a power mask; and
    wherein the determining the minimum CQI value for the second group of the CQI values comprises determining a minimum CQI value for a subset of the current CQI values used for a second transmission power level from the power mask.

14. The method of claim 10, wherein the determining the minimum CQI value for the first group of the CQI values comprises determining a minimum CQI value for a subset of the current CQI values associated with at least one of a first flow, a first traffic priority level/QoS class, and a first application; and wherein the determining the minimum CQI value for the second group of the CQI values comprises determining a minimum CQI value for a subset of the current CQI values associated with at least one of: a second flow, a second traffic priority level/QoS class, and a second application.

15. The method of claim 10, wherein the determining the minimum CQI value from the set of current CQI values based on the required percentile comprises:

determining a minimum CQI value of the required percentile highest CQI values of the set of current CQI values.

16. A method comprising:

sending a percentile request to a wireless node;

receiving a minimum channel quality indication (CQI) value from a first group of CQI values from the wireless node, the minimum CQI value for the first group of CQI values being based on a current set of CQI values based on a required percentile maintained at the wireless node;

receiving a minimum CQI value from a second group of the CQI values from the wireless node, the minimum CQI value for the second group of CQI values being based on the current set of CQI values based on the required percentile maintained at the wireless node;

determining or selecting at least one of a modulation scheme and coding rate for data transmissions to the wireless node based on the minimum CQI value for the first or for second groups; and receiving the minimum CQI values for the first and second groups in response to a percentile request to indicate the channel quality of a plurality of wireless sub-channels, wherein the receiving the minimum CQI value for the first and second groups from the wireless node, the minimum CQI value for the first and second groups being based on the current set of CQI values based on a required percentile, comprises:

receiving a minimum CQI value for the first and second groups that is in a highest percentile of the current set of CQI values.

17. The method of claim 16 wherein the receiving the minimum CQI values from the first and second groups comprises:

receiving a minimum CQI value for a subset of the current CQI values maintained by the wireless node that are associated with at least one of a first flow, a first traffic priority level/QoS class, and a first application; and receiving a minimum CQI value for a subset of the current CQI values maintained by the wireless node that are associated with at least one of a second flow, a second traffic priority level/QoS class, and a second application.

18. The method of claim 16 wherein the receiving the minimum CQI value values from the first and second group comprises:

receiving the minimum CQI value values from the first and second groups for a subset of the current CQI values maintained by the wireless node associated with the transmission of data to the wireless node at a first transmission power level of a power mask; and receiving a minimum CQI value for a subset of the current CQI values maintained by the wireless node associated with the transmission of data to the wireless node at a second transmission power level of the power mask.

19. The method of claim 16 wherein the receiving the minimum CQI values from the first and second groups comprises:

receiving a minimum CQI value for a best-M of sub-channels based on the set of current CQI values from the wireless node; and receiving a minimum CQI value for other than the best-M sub-channels.

20. The method of claim 16 wherein the determining or selecting at least one of the modulation scheme and coding rate comprises:

determining or selecting at least one of the modulation scheme and coding rate for data transmissions to the wireless node based on the percentile CQI value and based on at least one of a delay constraint or delay limitation for data transmitted to the wireless node;

an application at the wireless node that is receiving packets and a sensitivity to delay of the application;

a target error rate or target block error rate; and a number of hops in a communication path between a base station and the wireless node.

21. The method of claim 16, wherein the receiving the minimum CQI values from the first and second groups from the set of current CQI values based on the required percentile comprises:

determining a minimum CQI value of the required percentile highest CQI values of the set of current CQI values.

* * * * *